US008145466B1

(12) United States Patent
Chan et al.

(10) Patent No.: US 8,145,466 B1
(45) Date of Patent: Mar. 27, 2012

(54) CLUSTERING OF ELECTRONIC CIRCUIT DESIGN MODULES FOR HARDWARE-BASED AND SOFTWARE-BASED CO-SIMULATION PLATFORMS

(75) Inventors: Chi Bun Chan, San Jose, CA (US); Jingzhao Ou, San Jose, CA (US); Haibing Ma, Superior, CO (US); Shay P. Seng, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 441 days.

(21) Appl. No.: 12/469,897

(22) Filed: May 21, 2009

(51) Int. Cl.
*G06F 17/50* (2006.01)
(52) U.S. Cl. .......................................... 703/14
(58) Field of Classification Search .............. 703/13–16; 716/101, 102, 105
See application file for complete search history.

(56) References Cited

U.S. PATENT DOCUMENTS

| | | | | |
|---|---|---|---|---|
| 5,960,191 A * | 9/1999 | Sample et al. | .................. | 703/28 |
| 6,009,256 A * | 12/1999 | Tseng et al. | .................... | 703/13 |
| 6,026,230 A * | 2/2000 | Lin et al. | ......................... | 703/13 |
| 6,178,542 B1 * | 1/2001 | Dave | ............................. | 716/105 |
| 6,389,379 B1 * | 5/2002 | Lin et al. | ........................ | 703/14 |
| 7,640,155 B2 * | 12/2009 | Poplack et al. | ................. | 703/23 |

OTHER PUBLICATIONS

Ho et al, A Clustering Approach for Identifying and Quantifying Irregularities in Interconnection Networks, IEEE Transactions on Parallel and Distributed Systems, vol. 14, No. 12, Dec. 2003, pp. 1222-1239.*
De Michell et al, Hardware/Software Co-Design, Readings in Hardware/Software Co-Design, 2002, pp. 30-44.*
Zivojnovic et al, Compiled HW/SW Co-Simulation, IEEE, 33rd Design Automation Conference, 1996, pp. 690-695.*
Lu et al, Cluster Model for Optimal Double-Loop Connected Network, IEEE Region 10 Conference on Computer, Communication, Control and Power Engineering, 1993, pp. 162-165.*
Beattie et al, Hierarchical Interconnect Circuit Models, portal.acm.org/citation.cfm?id=602952, 2000, pp. 215-221.*
Codrescu et al, Modeling Technology Impact on Cluster Microprocessor Performance, Transactions on Very Large Scale Integration (VLSI) Systems, vol. 11, No. 5, 2003, pp. 909-920.*

* cited by examiner

*Primary Examiner* — Russell Frejd
(74) *Attorney, Agent, or Firm* — LeRoy D. Maunu

(57) ABSTRACT

Approaches for preparing simulation models of an electronic circuit are disclosed. The design is partitioned into first and second clusters. The design includes a source module in the first cluster connected to a destination module in the second cluster. The first cluster is compiled into a first model for a software-based co-simulation platform for simulating behavior of the source module using the first model. The first cluster and the second cluster of the design are compiled into a second model for a hardware-based co-simulation platform that includes a programmable logic circuit configurable for emulating behavior of the design using the second model. An interconnection block is generated and stored in the second model. The interconnection block is switchable between coupling of the destination module in the second model to the source module of the first model or to a source module of the second model.

20 Claims, 6 Drawing Sheets

CLUSTERING OF ELECTRONIC CIRCUIT DESIGN MODULES FOR HARDWARE-BASED AND SOFTWARE-BASED CO-SIMULATION PLATFORMS

FIELD OF THE INVENTION

The present invention generally relates to creating simulation models from the modules of an electronic circuit design for use with software-based and hardware co-simulation engines.

BACKGROUND

Co-simulation refers to partitioning an electronic circuit design into multiple portions and executing simulation models of those portions on different co-simulation platforms. The co-simulation platforms may be a combination of software-based and hardware-based co-simulation platforms.

In a software-based co-simulation platform, a portion of the design is modeled and simulated with software running on a workstation, for example. In a hardware-based co-simulation platform, a portion of the design is emulated on a hardware platform that includes a programmable logic device (PLD), such as a field programmable gate array (FPGA), where the emulated portion of the design is implemented as a circuit on the PLD.

The hardware-based co-simulation platform operates under the control of the software-based co-simulation platform which coordinates communication and data transfers between the parts of the design on the hardware-based co-simulation platform and the parts of the design on the software-based co-simulation platform. Co-simulation using a hardware-based co-simulation platform may reduce the time required for a simulation run, provide hardware debugging capabilities, along with real-time verification capabilities. The Modelsim simulator and the NC-SIM simulator from Cadence are examples of software-based co-simulation platforms, and the Wildcard development platform from Annapolis Microsystems and the Benone development platform from Nallatech are examples of hardware-based co-simulation platforms. The WildCard and Benone platforms are often used for algorithm exploration and design prototyping.

In typical hardware-based co-simulation platforms, a hardware co-simulation interface (HWCIF) is combined with the portion of the design to be emulated on the hardware (design under test or "DUT"). The HWCIF is a circuit that supports interactions between the software-based co-simulation platform and the DUT. The DUT is interfaced with the HWCIF via memory mapped registers that are associated with the input/output ports of the DUT. Data is pushed into an input port of the DUT by the software-based co-simulation platform performing a memory write to the address which is mapped to one of the registers. Similarly, data is retrieved from an output port through the software-based co-simulation platform performing a memory read. The software-based co-simulation platform issues read/write operations by sending commands to the HWCIF over a communication interface. The HWCIF may be implemented with a command processor that translates commands into operations suitable for the DUT. To facilitate lock-step simulations, the HWCIF also controls clocking of the DUT. The DUT clock is temporarily gated off during the transmission of stimuli and results. After a transmission is complete, one or multiple clock cycle pulses may be applied to the DUT as controlled by the software-based co-simulation platform.

Most design tools recognize and support a hierarchical specification of the design, which allows the design to be specified and viewed at different levels of abstraction. In graphical user interface (GUI) tools the term "block" is sometimes used to refer to a collection of parts of a design that perform a function. In other tools, the term "module" is used to refer to collection of parts of a design that perform a function. Each block or module has a defined set of input and output ports that are connected to other blocks or modules of the design.

Hardware co-simulation helps accelerate simulation of the design, and a designer would typically desire co-simulating in hardware those modules of the design that have been sufficiently developed and tested. As development and testing of the overall design proceeds, the designer may desire to co-simulate in hardware additional modules of the design. Also, in some scenarios a designer may desire to switch between co-simulating a module in hardware or software of different simulation runs.

The present invention may address one or more of the above issues.

SUMMARY

The embodiments of the present invention provide approaches for preparing simulation models of an electronic circuit design. In one embodiment, in response to designer input, the design is partitioned into at least first and second clusters. The design includes a source module in the first cluster connected to a destination module in the second cluster. The first cluster is compiled into a first model for a software-based co-simulation platform that includes a processor for executing software that simulates behavior of the source module using the first model. The first cluster and the second cluster of the design are compiled into a second model for a hardware-based co-simulation platform that includes a programmable logic circuit configurable for emulating behavior of the design using the second model. An interconnection block is generated and stored in the second model. The interconnection block is switchable between coupling of the destination module in the second model to the source module of the first model or to a source module of the second model.

In another embodiment, an article of manufacture comprises a processor-readable storage device configured with instructions for preparing simulation models of an electronic circuit design. The instructions when executed cause one or more processors to perform the operations including partitioning the design into at least first and second clusters in response to designer input. The design includes a source module in the first cluster connected to a destination module in the second cluster. The first cluster is compiled into a first model for a software-based co-simulation platform that includes a processor for executing software that simulates behavior of the source module using the first model. The first cluster and the second cluster of the design are compiled into a second model for a hardware-based co-simulation platform that includes a programmable logic circuit configurable for emulating behavior of the design using the second model. An interconnection block is generated and stored in the second model. The interconnection block is switchable between coupling of the destination module in the second model to the source module of the first model or to a source module of the second model.

A system for preparing simulation models of an electronic circuit design is provided in another embodiment. The system comprises a processor arrangement coupled to a storage arrangement. The storage arrangement is configured with instructions for preparing simulation models of an electronic circuit design. The instructions when executed cause the processor arrangement to perform operations including partitioning the design into at least first and second clusters in response to designer input. The design includes a source module in the first cluster connected to a destination module in the second cluster. The first cluster is compiled into a first model for a software-based co-simulation platform that includes a processor for executing software that simulates behavior of the source module using the first model. The first cluster and the second cluster of the design are compiled into a second model for a hardware-based co-simulation platform that includes a programmable logic circuit configurable for emulating behavior of the design using the second model. An interconnection block is generated and stored in the second model. The interconnection block is switchable between coupling of the destination module in the second model to the source module of the first model or to a source module of the second model.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In current systems that support hardware-software co-simulation, only one module can be designated for hardware co-simulation. The designer must choose either the entire design or one sub-module to be co-simulated in hardware. If the designer wants to co-simulate several modules in hardware, those modules must be assembled into a larger module and that larger module compiled for hardware co-simulation. This effort is cumbersome and may be error prone. In addition, the desired modules may be in different branches of the design hierarchy, and assembling those modules into the larger module would change the hierarchy and thereby obfuscate the design.

The various embodiments of the invention provide approaches for preparing simulation models of an electronic circuit design. The designer is provided with the ability to divide the design into a number of clusters and individually designate each cluster to be simulated on either a software-based co-simulation platform or a hardware-based co-simulation platform. The clusters may span branches of the hierarchy. However, the clusters do not change the hierarchical structure of the design.

The clusters selected for software-based co-simulation are compiled into a simulation model for the software-based co-simulation platform. For the hardware-based co-simulation platform, all of the clusters are compiled into a simulation model for simulation on the hardware-based co-simulation platform. One or more interconnection blocks are generated for the hardware co-simulation model. For each connection from a module in one cluster to a module in another cluster, an interconnection block is inserted in the model for switching the module-to-module connection between the hardware and software co-simulation models. For example, for a first module in a first cluster to be co-simulated in software and a second module in a second cluster to be co-simulated in hardware, both the first and second clusters are compiled into the hardware co-simulation model and an interconnection block is used to couple the first module to the second module. The interconnection block is switchable between connecting the first module in the software co-simulation model to the second module in the hardware co-simulation model or connecting the first module in the hardware co-simulation model to the second module in the hardware co-simulation model.

Figure 1:
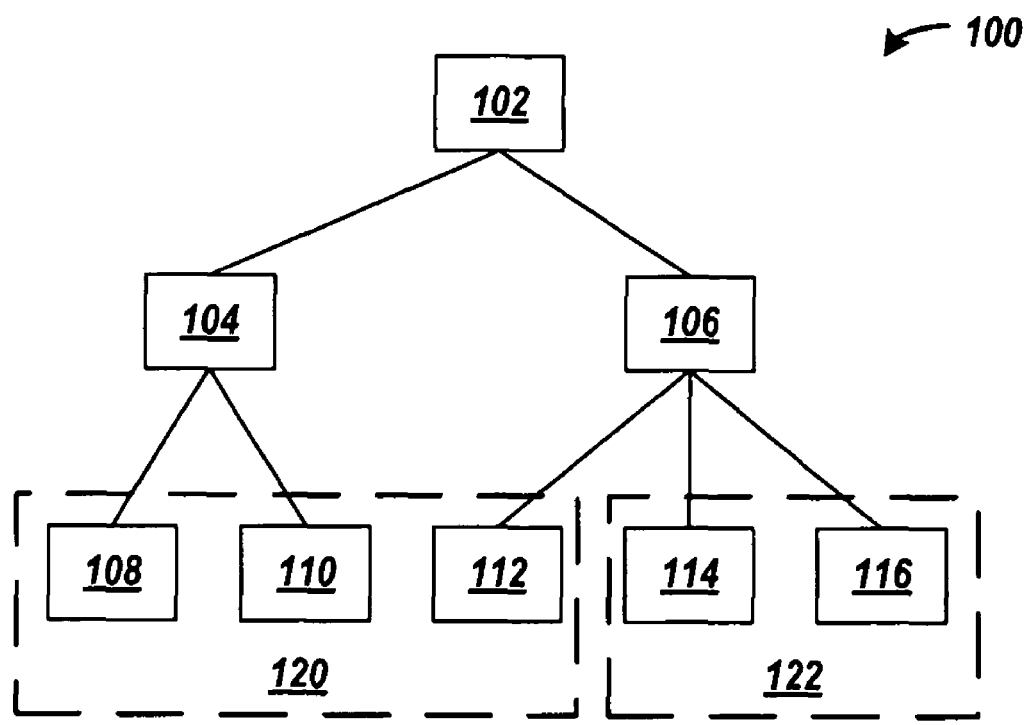
FIG. 1 shows a hierarchy of modules of an example electronic circuit design along with example clusters.

FIG. 1 shows a hierarchy of modules of an example electronic circuit design along with example clusters. In the example design hierarchy 100 a top-level module 102 contains modules 104 and 106. Those skilled in the art will recognize that data and control flow relationships are typically not depicted in the design hierarchy. Rather, the hierarchy depicts levels of abstraction of functions of the design. The modules at the lowest level specify functions of the design in a form that can be compiled into a simulation model or into a hardware realization. Module 104 contains modules 108 and 110, and module 106 contains modules 112, 114, and 116. Module 104 is a parent of modules 108 and 110, and module 106 is a parent of modules 112, 114, and 116.

In accordance with an embodiment of the invention, the design is partitioned into multiple clusters in response to the designer designating which modules comprise the clusters. Typically, the designer would define the clusters based on the design hierarchy, the functional relationships between the modules, or in a manner that would aid in testing and debugging the design.

In the example design, cluster 120 has been defined to include modules 108, 110, and 112, and cluster 122 has been defined to include modules 114 and 116. Various user interfaces may be provided for specifying the clusters. For example, a GUI may be provided through which the designer can add modules to a cluster by pointing and clicking or by drawing a box around those modules. The GUI may present a hierarchical view of the design, as shown in FIG. 1, or a block diagram view (not shown) of the design which shows data and control connections between modules. Depending on the particular design tool and format in which the design is specified, design units other than "modules" may be referenced in defining the clusters. For example, in the System Generator for DSP tool from XILINX®, a cluster may be defined to include one or more subsystems.

With the cluster approach for partitioning the design, the hierarchical relationship of modules is preserved even though modules having the same parent are in different clusters. For example, modules 112 and 114 have module 106 as a parent but are included in different clusters.

Each of the clusters of a design may be individually designated for simulation on the software-based co-simulation platform or the hardware-based co-simulation platform. The cluster(s) designated for the software-based co-simulation platform are compiled into a simulation model for the software-based co-simulation platform. For the hardware-based co-simulation platform, all of the clusters are compiled into a model for simulation on the hardware-based co-simulation platform. However, only those clusters designated for hardware-based co-simulation are enabled during the simulation. In the model for simulation on the hardware-based co-simulation platform, the compilation generates configurable interconnection blocks which are used to couple modules in different clusters where those modules have data or control connections in the design.

Figure 2:
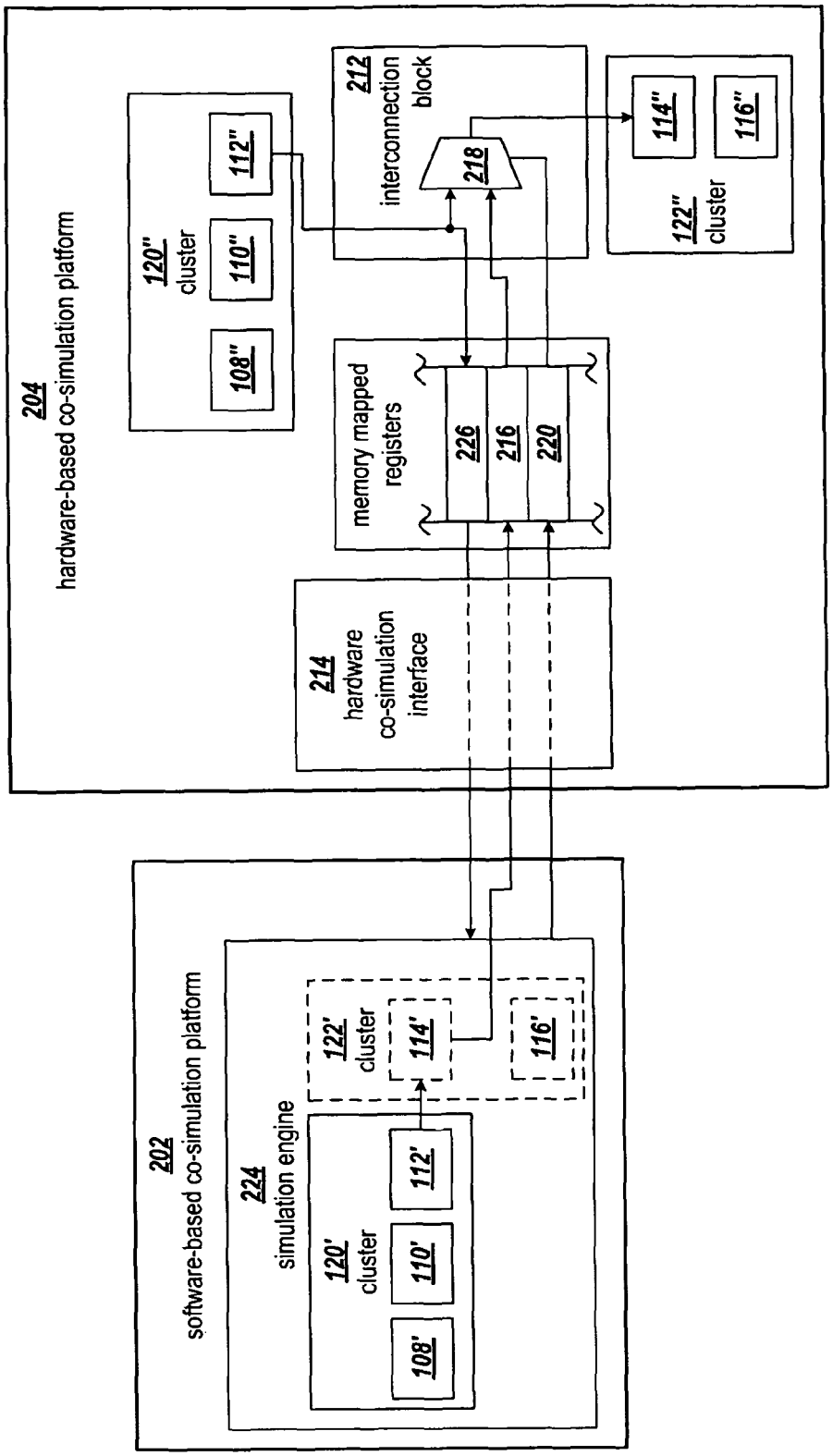
FIG. 2 shows a software-based co-simulation platform and a hardware-based co-simulation platform for simulating the design of FIG. 1 using models prepared from example clusters.

FIG. 2 shows a software-based co-simulation platform and a hardware-based co-simulation platform for simulating the design of FIG. 1 using models prepared from the example clusters 120 and 122. FIG. 2 shows an example arrangement in which cluster 120 (FIG. 1) has been designated for simulation on the software-based co-simulation platform 202, and cluster 122 has been designated for simulation on the hardware-based co-simulation platform 204. The example assumes a data connection from module 112 to module 114.

The following notation is used to differentiate between the modules of the design and the designated clusters, the models for software-based co-simulation based on those modules and clusters, and the models for hardware-based co-simulation based on those modules and clusters. The base module/cluster is labeled with reference numeral X, the corresponding model for software-based co-simulation is labeled with reference numeral X', and the corresponding model for hardware-based co-simulation is labeled with reference numeral X". For ease of exposition, the modules and clusters and the models that represent them are both referred to as modules and clusters in the discussion below.

Cluster 120' and modules 108', 110', and 112' correspond to cluster 120 and modules 108, 110, and 112 of FIG. 1. Since cluster 122 has been designated for hardware-based co-simulation, cluster 122' is a proxy and is depicted with dashed lines. Cluster 120" and modules 108", 110", and 112" correspond to cluster 120 and modules 108, 110, and 112 of FIG. 1, and cluster 122" and modules 114" and 116" correspond to cluster 122 and modules 114 and 116 of FIG. 1.

In compiling the clusters 120 and 122 for co-simulation, both of clusters 120 and 122 are compiled into circuits (clusters 120" and 122") targeted to the hardware-based co-simulation platform 204. To implement the connection from module 112 to module 114 as specified in the design and according to one embodiment of the invention, an interconnection block 212 is generated for switching between coupling module 112' (software) to module 114" or coupling module 112" (hardware) to module 114". The interconnection block receives signals from both of modules 112' and 112" and selects the desired signal based on the designer's desired co-simulation. When module 112 is to be co-simulated on the software-based co-simulation platform 202, the interconnection block selects the signal from module 112', which is passed through the proxy module 114', through the hardware co-simulation interface 214, and through the memory mapped register 216. If module 112 were to be co-simulated on the hardware-based co-simulation platform 104, the interconnection block would select the signal from module 112". In one embodiment, the interconnection block includes a multiplexer 218 that selects between a signal from a memory mapped register (e.g., 216) and a signal from the module implemented in hardware. The multiplexer is controlled by the value in memory mapped register 220, for example.

The simulation engine 224 controls the overall co-simulation of the design by scheduling simulation events for the clusters 120' and 120", providing input data from the software-based co-simulation to the hardware-based co-simulation, receiving data from the hardware-based co-simulation and providing that data to the software-based co-simulation, and controlling the clock signal(s) for the circuits on the hardware-based co-simulation platform. The simulation engine 224 is software that executes on a computer such as a workstation and is coupled to the hardware-based co-simulation platform 204 by means known in the art. The hardware co-simulation interface 214 on the hardware-based co-simulation platform provides the mechanism for controlling the co-simulation of circuits on the hardware-based co-simulation platform by the simulation engine. In one embodiment, the hardware co-simulation interface is command driven for reading from and writing to memory mapped registers 216, 220, and 226, for example.

A trace of the co-simulation data path from module 112' to module 114" begins with the simulation engine 224 scheduling an output event from module 112' to module 114'. Since module 114' is a proxy for module 114", which is co-simulated in hardware, the simulation engine passes the output to the hardware co-simulation interface 214, which writes the data to register 216. At some time before or during the simulation, the simulation engine writes a control value to memory mapped register 220 to cause multiplexer 218 in the interconnection block to select the data from the register 216 instead of the data from the module 112". When the clock of the hardware-based co-simulation platform is advanced by the simulation engine, the data value from the register 216 is provided to the module 114". It will be appreciated that in another co-simulation scenario both of clusters 120" and 122" may be co-simulated on the hardware-based co-simulation platform, with module 114" receiving input from module 112". In this scenario, the simulation engine writes a value to register 220 for causing multiplexer 218 to select the input from module 112" instead of the input from register 216.

In another embodiment, the interconnection block splits the signal from module 112" such that the output from module 112" is provided both to multiplexer 218 and to memory mapped register 226. This allows the output from the co-simulated module 112" to be viewed and manipulated by the simulation engine 224. This may be useful for comparing results of the software-based and hardware based co-simulation of modules 112' and 112". Alternatively, the simulation engine may ignore the output from module 112".

With the interconnection blocks that are configurable via the simulation engine, those skilled in the art will recognize various usage scenarios. For example, a module may be switched between software-based and hardware-based co-simulation simply by configuring the appropriate memory mapped register (e.g., 220) for controlling the interconnection block. As mentioned above, a module may be co-simulated both on the software-based and on the hardware-based co-simulation platforms for co-verification of the module. In another case, the design may be incrementally modified and the modified portion co-simulated in software, with no need to recompile the entire design for hardware-based co-simulation. The execution schedule of modules may also be modified by the simulation engine by changing the order in which the ports are sampled.

The ability to switch between software-based co-simulation and hardware-based co-simulation is useful for debugging purposes. For example, a cluster may be initially co-simulated in hardware, and during the co-simulation a problem is detected. The embodiments of the present invention allow the cluster to instead be co-simulated in software, which provide more control over the module and visibility of various signals. Once debugging is complete the module may once again be co-simulated in hardware.

The example co-simulation shows there being only one connection between clusters 120 and 122. For a design having multiple connections between clusters, multiple interconnection blocks 212 would be generated, one for each connection. In addition, there would be additional, corresponding sets of memory mapped registers for those connections.

Figure 3:
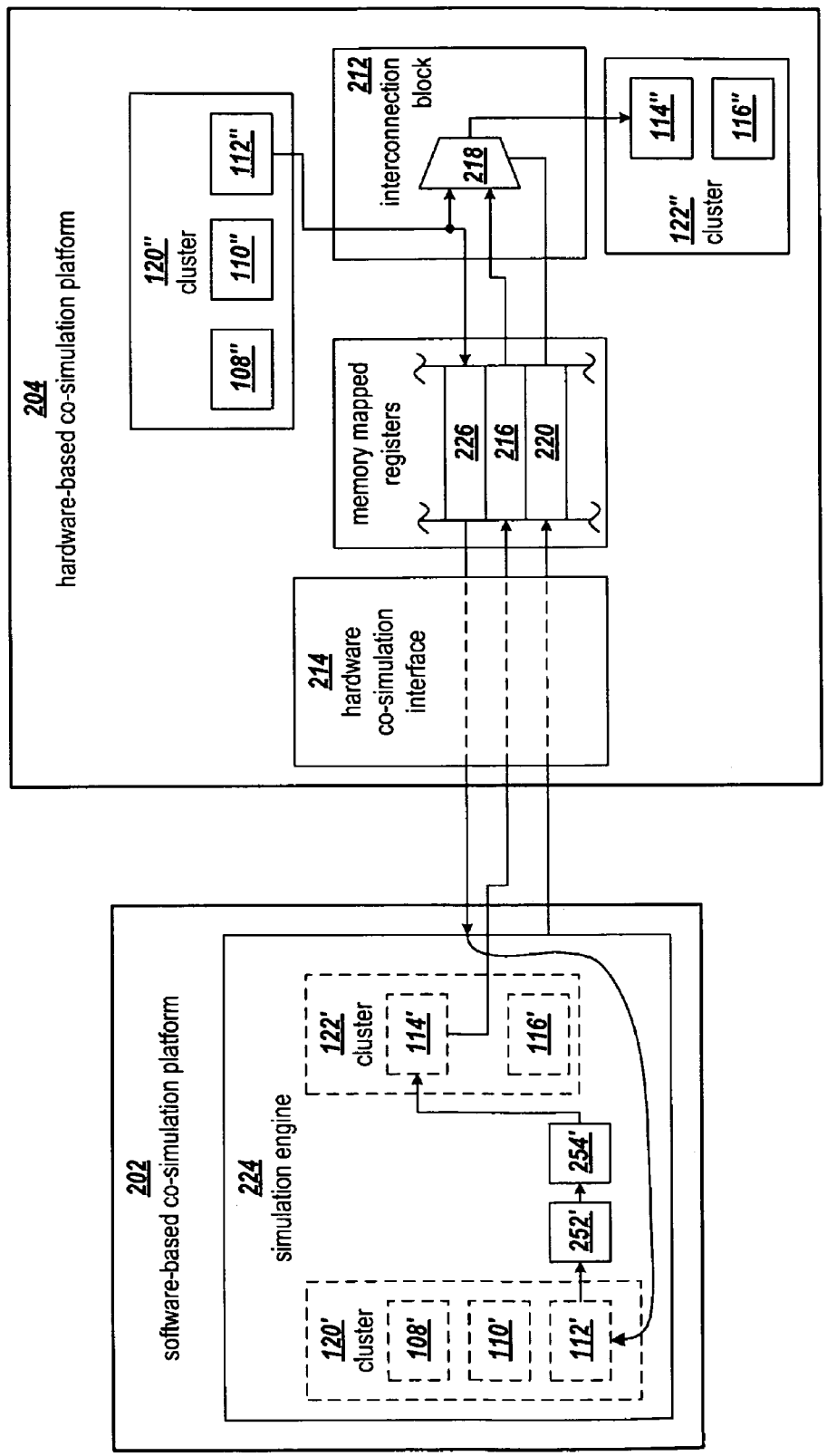
FIG. 3 is a block diagram showing a modification to the example of FIG. 2 in which pipeline stages have been added, with clusters being simulated on the hardware-based co-simulation platform.

FIG. 3 is a block diagram showing a modification to the example of FIG. 2 in which pipeline stages have been added between modules 112 and 114, with clusters 120" and 122" both being simulated on the hardware-based co-simulation platform. The simulation in FIG. 3 shows that certain design modifications may be made, and the resulting design can be co-simulated without having to recompile the entire design.

The initial state of the design is that described for FIG. 2, with output from module 112 being provided as input to module 114. An initial simulation has clusters 120" and 122" both co-simulated on the hardware-based co-simulation platform. The modification to the design includes the addition of pipeline stages between the output of module 112 and the input of module 114. The pipeline stages are depicted in FIG. 3 as modules 252' and 254' being connected between the proxy cluster 120' and the proxy cluster 122'.

According to embodiments of the present invention, the added modules may be co-simulated on the software-based co-simulation platform in combination with modules 120" and 122" being co-simulated on the hardware-based co-simulation platform without having to recompile modules 120 or 122 or other parts of the design for hardware-based co-simulation. The modules 252' and 254' are added to the co-simulation by configuring memory mapped register 220 with a value to cause multiplexer 218 to select from register 216 instead of the output from the module 112". In addition, since the modified design has the output from module 112 connected to the input of the first stage of the pipeline (module 252'), the simulation engine reads from memory mapped register 226, which holds the output from co-simulated module 112", and provides that data to the proxy module 112'. The data input to the proxy module 112' is passed without processing to the module 252' since module 112" is co-simulated in hardware. The output from module 252' is input to module 254', which passes its output to proxy module 114'. Since module 114" is co-simulated in hardware, the data is passed through proxy module 114' without further processing and written to memory mapped register 216 by the simulation engine. The multiplexer 218 selects data from register 216 for input to the co-simulated module 114".

Figure 4:
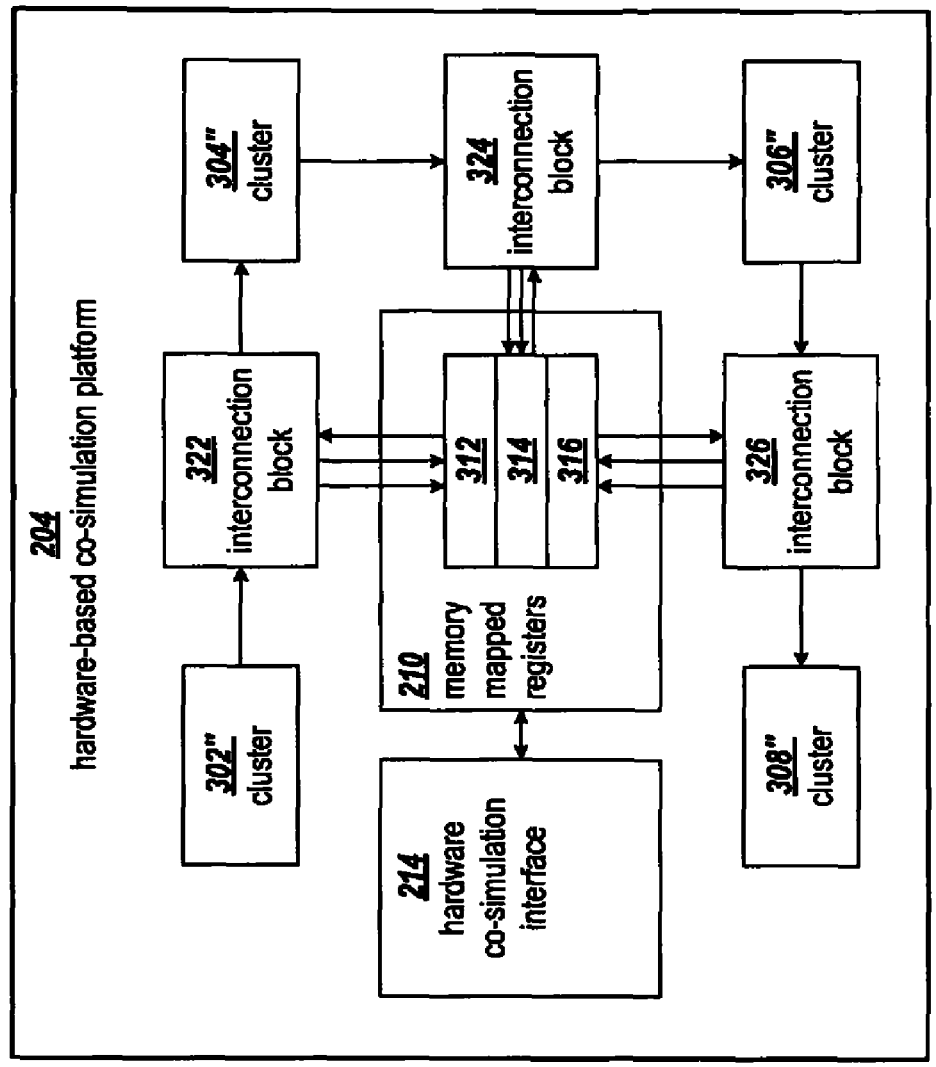
FIG. 4 is a block diagram of a hardware-based co-simulation platform configured to co-simulate multiple clusters of another example design.

FIG. 4 is a block diagram of a hardware-based co-simulation platform configured to co-simulate multiple clusters of another example design. The example shown in FIGS. 2 and 3 includes only two clusters. As shown in FIG. 4, however, any number of clusters may be co-simulated on the hardware-based co-simulation platform in accordance with embodiments of the present invention. For each connection between a pair of clusters as specified in the design, an interconnection block is used to couple the corresponding clusters on the hardware co-simulation platform.

The example design includes multiple clusters, which correspond to the clusters 302", 304", 306", and 308" on the hardware-based co-simulation platform. For ease of illustration, there are single connections between the clusters. For each such connection a respective interconnection block is generated for the hardware-based co-simulation. Interconnection block 322 couples cluster 302" to cluster 304", interconnection block 324 couples cluster 304" to cluster 306", and interconnection block 326 couples cluster 306" to cluster 308".

Each of the interconnection blocks is coupled to a set of memory mapped registers. Interconnection block 322 is coupled to register set 312, interconnection block 324 is coupled to register set 314, and interconnection block 326 is coupled to register set 316. Each set of registers includes a register (not shown) for conveying data from the hardware-based co-simulation platform to the software-based platform, a register (not shown) for conveying data from the software-based co-simulation platform to the hardware-based co-simulation platform, and a register (not shown) for controlling the multiplexer in the corresponding interconnection block. These registers are described in the example embodiment shown in FIG. 2.

Figure 5:
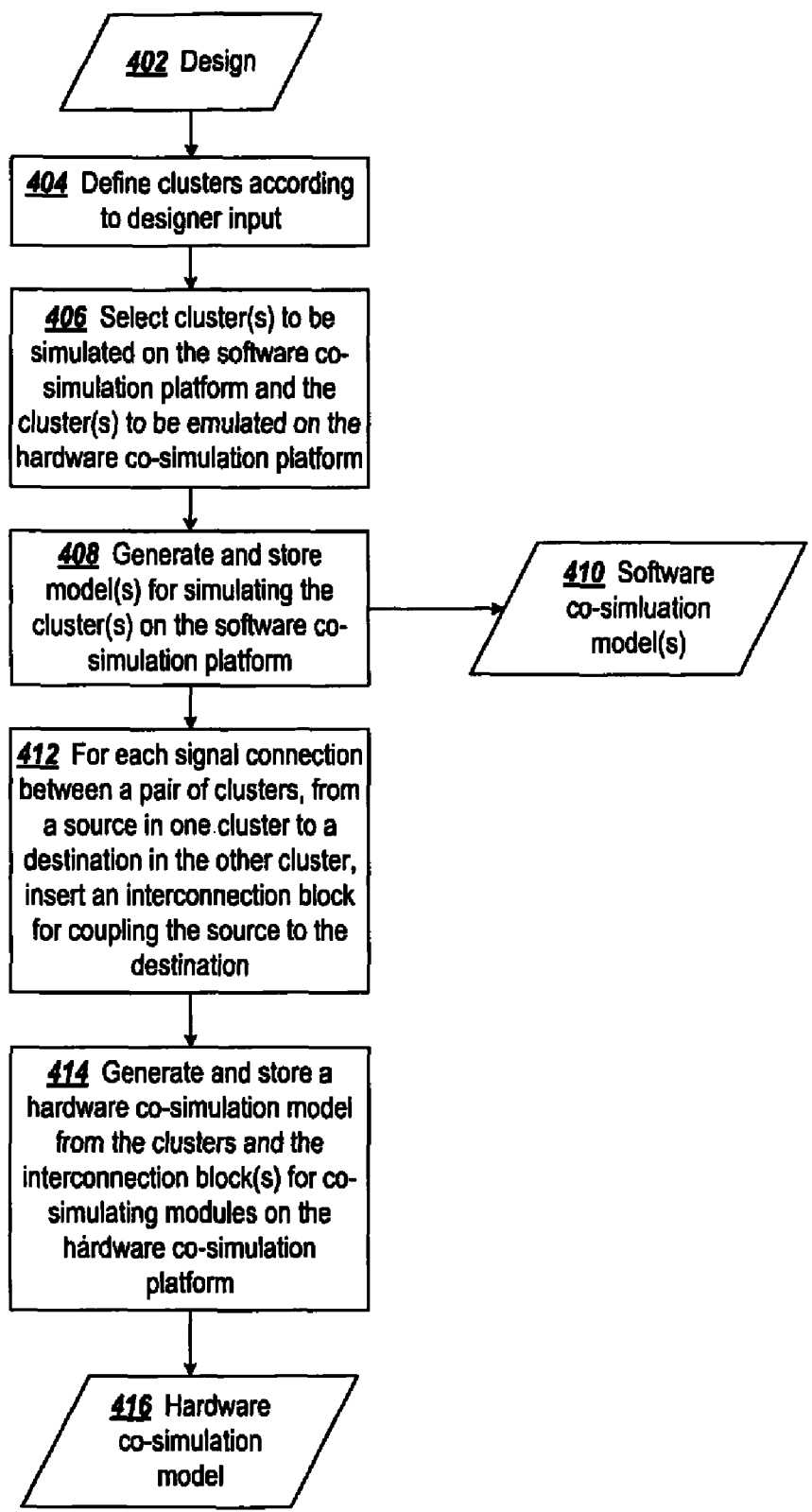
FIG. 5 is a flowchart of an example process for preparing models for simulating an electronic circuit design in accordance with various embodiments of the invention.

FIG. 5 is a flowchart of an example process for preparing models for simulating an electronic circuit design in accordance with various embodiments of the invention. A design 402 is input to the process, and step 404 defines clusters of the design in response to input controls from the designer. The design may be in block diagram form or in a hardware description language, for example. At step 406, in response to further designer input, each cluster defined by the designer is selected for co-simulation either on a software-based co-simulation platform or on a hardware-based co-simulation platform. The models for simulating the clusters on the software-based co-simulation platform are generated at step 408 and stored as software co-simulation models 410.

At step 412, the signal connections between the clusters are determined from the input design. For each signal connection between a pair of clusters, from a source in one cluster to a destination in the other cluster, an interconnection block is inserted for coupling the source to the destination. The interconnection block is not inserted in the actual design. Rather the interconnection block is inserted in a supplemental representation of the design for purposes of generating a model for hardware-based co-simulation.

A hardware co-simulation model is generated from the clusters and interconnection blocks at step 414 and stored as hardware co-simulation model 416. As described above, all the clusters of the design are compiled into the hardware co-simulation model, including those clusters designated for software-based co-simulation. Generally known tools may be used for generating the hardware co-simulation model. In an example embodiment, the hardware co-simulation model is a configuration bitstream for an FPGA.

Figure 6:
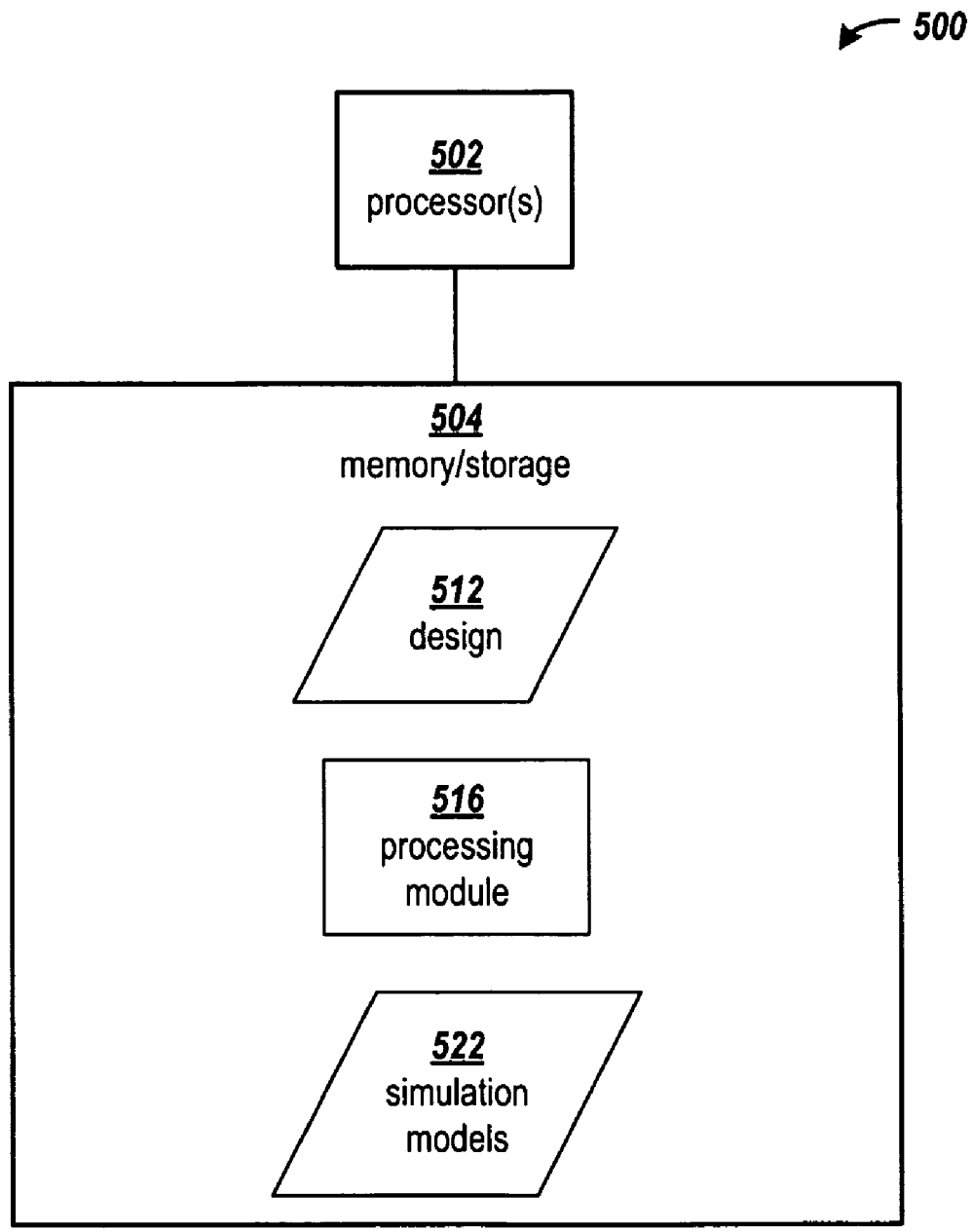
FIG. 6 is a block diagram of an example computing arrangement on which the processes described herein may be implemented.

FIG. 6 is a block diagram of an example computing arrangement on which the processes described herein may be implemented. Those skilled in the art will appreciate that various alternative computing arrangements, including one or more processors and a memory arrangement configured with program code, would be suitable for hosting the processes and data structures and implementing the algorithms of the different embodiments of the present invention. In addition, program code that implements the processes may be provided via a variety of computer-readable storage media or delivery channels such as magnetic or optical disks or tapes, electronic storage devices, or as application services over a network.

Computing arrangement 500 includes one or more processors 502 coupled to a memory/storage arrangement 504. The architecture of the computing arrangement depends on implementation requirements as would be recognized by those skilled in the art. The processor 502 may be one or more general purpose processors, or a combination of one or more general purpose processors and suitable co-processors, or one or more specialized processors (e.g., RISC, pipelined, etc.).

The memory/storage arrangement 504 is representative of hierarchical storage commonly found in computing arrangements. Such hierarchical storage typically includes multiple levels of cache memory, a main memory, and local and/or remote persistent storage such as provided by magnetic disks (not shown). The memory/storage arrangement may include one or both of local and remote memory/storage, remote storage being coupled to the processor arrangement via a local area network, for example.

The processor arrangement 502 executes the software stored in memory/storage arrangement 504, and reads data from and stores data to the memory/storage arrangement according to the processes described above. An operating system (not shown) manages the resources of the computing arrangement. The processing module 516 inputs design data 512 and generates software and hardware co-simulation models as described herein. In performing the processes, the processing module stores software co-simulation and hardware co-simulation models 522 in the memory/storage arrangement.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

The present invention is thought to be applicable to a variety of systems for co-simulating electronic circuit designs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for preparing simulation models of an electronic circuit design, comprising:
   in response to designer input, partitioning the design into at least first and second clusters, wherein the design includes a source module in the first cluster connected to a destination module in the second cluster;
   compiling by a processor, the first cluster into a first model for a software-based co-simulation platform that includes a processor for executing software that simulates behavior of the source module using the first model;
   compiling by the processor, the first cluster and the second cluster of the design into a second model for a hardware-based co-simulation platform that includes a programmable logic circuit configurable for emulating behavior of the design using the second model; and
   generating and storing by the processor, an interconnection block in the second model that is switchable between coupling of the destination module in the second model to the source module of the first model or to a source module of the second model.

2. The method of claim 1, wherein the source module and the destination module have a common parent module in a hierarchy of the design.

3. The method of claim 1, wherein the generating an interconnection block includes generating a respective interconnection block for each connection from a module in one cluster to a module in another cluster.

4. The method of claim 1, wherein the compiling the first and second clusters into the second model includes compiling all clusters into the second model.

5. The method of claim 1, wherein the interconnection block includes a multiplexer for selecting either data from the source module in the first model or data from the source module in the second model for input to the destination module.

6. The method of claim 5, further comprising generating a memory mapped interface to be implemented on the hardware-based co-simulation platform for co-simulation, wherein the memory mapped interface includes a first register for conveying data from the source module in the second model to the software-based co-simulation platform, and a second register for conveying data from the source module in the first model to the second destination module in the second model.

7. The method of claim 6, wherein the memory mapped interface includes a third register for controlling selection by the multiplexer in the interconnection block.

8. The method of claim 7, wherein the third register is configurable by the software-based co-simulation platform.

9. The method of claim 6, wherein the interconnection block splits data from the source module in the second model for input to the multiplexer and for input to the first register of the memory mapped interface.

10. An article of manufacture, comprising:
    a processor-readable storage device configured with instructions for preparing simulation models of an electronic circuit design, the instructions when executed causing one or more processors to perform operations including:
    in response to designer input, partitioning the design into at least first and second clusters, wherein the design includes a source module in the first cluster connected to a destination module in the second cluster;
    compiling the first cluster into a first model for a software-based co-simulation platform that includes a processor for executing software that simulates behavior of the source module using the first model;
    compiling the first cluster and the second cluster of the design into a second model for a hardware-based co-simulation platform that includes a programmable logic circuit configurable for emulating behavior of the design using the second model; and
    generating and storing an interconnection block in the second model that is switchable between coupling of the destination module in the second model to the source module of the first model or to a source module of the second model.

11. The article of manufacture of claim 10, wherein the source module and the destination module have a common parent module in a hierarchy of the design.

12. The article of manufacture of claim 10, wherein the generating an interconnection block includes generating a respective interconnection block for each connection from a module in one cluster to a module in another cluster.

13. The article of manufacture of claim 10, wherein the compiling the first and second clusters into the second model includes compiling all clusters into the second model.

14. The article of manufacture of claim 10, wherein the interconnection block includes a multiplexer for selecting either data from the source module in the first model or data from the source module in the second model for input to the destination module.

15. The article of manufacture of claim 14, further comprising generating a memory mapped interface to be implemented on the hardware-based co-simulation platform for co-simulation, wherein the memory mapped interface includes a first register for conveying data from the source module in the second model to the software-based co-simulation platform, and a second register for conveying data from the source module in the first model to the destination module in the second model.

16. The article of manufacture of claim 15, wherein the memory mapped interface includes a third register for controlling selection by the multiplexer in the interconnection block.

17. The article of manufacture of claim 16, wherein the third register is configurable by the software-based co-simulation platform.

18. The article of manufacture of claim 15, wherein the interconnection block splits data from the source module in the second model for input to the multiplexer and for input to the first register of the memory mapped interface.

19. A system for preparing simulation models of an electronic circuit design, comprising:
    a processor arrangement;
    a storage arrangement coupled to the processor arrangement and configured with instructions for preparing simulation models of an electronic circuit design, the instructions when executed causing the processor arrangement to perform the operations including:
        in response to designer input, partitioning the design into at least first and second clusters, wherein the design includes a source module in the first cluster connected to a destination module in the second cluster;
        compiling the first cluster into a first model for a software-based co-simulation platform that includes a processor for executing software that simulates behavior of the source module using the first model;
        compiling the first cluster and the second cluster of the design into a second model for a hardware-based co-simulation platform that includes a programmable logic circuit configurable for emulating behavior of the design using the second model; and
        generating and storing an interconnection block in the second model that is switchable between coupling of the destination module in the second model to the source module of the first model or to a source module of the second model.

20. The system of claim 19, wherein the compiling the first and second clusters into the second model includes compiling all clusters into the second model.

* * * * *